(12) United States Patent
Farnsworth et al.

(10) Patent No.: US 10,810,679 B1
(45) Date of Patent: *Oct. 20, 2020

(54) SYSTEMS AND METHODS FOR UNMANNED VEHICLE MANAGEMENT

(71) Applicant: United Services Automobile Association (USAA), San Antonio, TX (US)

(72) Inventors: Anthony Scott Farnsworth, San Antonio, TX (US); Justin Dax Haslam, San Antonio, TX (US); Kathleen L. Swain, Kemah, TX (US); Teddy Joseph Edmond Voutour, Helotes, TX (US); Jess W. Gingrich, San Antonio, TX (US); Michael J. Allen, San Antonio, TX (US); Anthony G. Castiglione, San Antonio, TX (US); Jordan A. Newmark, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/123,329

(22) Filed: Sep. 6, 2018

Related U.S. Application Data

(63) Continuation of application No. 14/873,810, filed on Oct. 2, 2015, now Pat. No. 10,102,590.

(60) Provisional application No. 62/058,990, filed on Oct. 2, 2014, provisional application No. 62/108,137, filed on Jan. 27, 2015, provisional application No. 62/140,107, filed on Mar. 30, 2015, provisional application No. 62/148,823, filed on Apr. 17, 2015.

(51) Int. Cl.
| | | |
|---|---|---|
| *G06Q 10/06* | (2012.01) |
| *G06Q 40/08* | (2012.01) |
| *G08G 5/00* | (2006.01) |
| *H04L 9/08* | (2006.01) |

(52) U.S. Cl.
CPC ........... *G06Q 40/08* (2013.01); *G08G 5/0069* (2013.01); *H04L 9/08* (2013.01); *G06Q 10/0633* (2013.01)

(58) Field of Classification Search
CPC .......................... G06Q 10/0633; G06Q 40/08
See application file for complete search history.

(56) References Cited

U.S. PATENT DOCUMENTS

| | | |
|---|---|---|
| 8,229,768 B1 | 7/2012 | Hopkins, III |
| 8,346,578 B1 | 1/2013 | Hopkins, III et al. |
| 9,164,506 B1 | 10/2015 | Zang |
| 9,684,834 B1 | 6/2017 | Ludwig et al. |
| 9,805,582 B2 | 10/2017 | Jedwab |
| 2008/0159591 A1 | 7/2008 | Ruedin |
| 2008/0225132 A1 | 9/2008 | Inaguma |
| 2008/0300924 A1 | 12/2008 | Savage et al. |
| 2009/0265193 A1 | 10/2009 | Collins et al. |
| 2010/0004802 A1 | 1/2010 | Bodin et al. |
| 2010/0026489 A1 | 2/2010 | Jordan et al. |
| 2011/0310273 A1 | 12/2011 | Pien |
| 2012/0120268 A1 | 5/2012 | Bockus et al. |

(Continued)

*Primary Examiner* — Scott S Trotter
(74) *Attorney, Agent, or Firm* — BakerHostetler

(57) ABSTRACT

A property is identified about which to gather information. A vehicle is deployed to a location associated with the property. The vehicle gathers data at the location. A portion of the gathered data indicating a condition or event at the property is determined and encrypted. The portion of the gathered data is stored or sent to an authorized party.

20 Claims, 12 Drawing Sheets

(56) References Cited

U.S. PATENT DOCUMENTS

| | | |
|---|---|---|
| 2013/0317865 A1 | 11/2013 | Tofte et al. |
| 2014/0132409 A1 | 5/2014 | Billman et al. |
| 2014/0267627 A1 | 9/2014 | Freeman et al. |
| 2015/0019267 A1 | 1/2015 | Prieto et al. |
| 2015/0170288 A1 | 6/2015 | Harton et al. |
| 2015/0341535 A1 | 11/2015 | Forutanpour et al. |
| 2015/0363717 A1 | 12/2015 | Lim |
| 2016/0282468 A1 | 9/2016 | Gruver et al. |

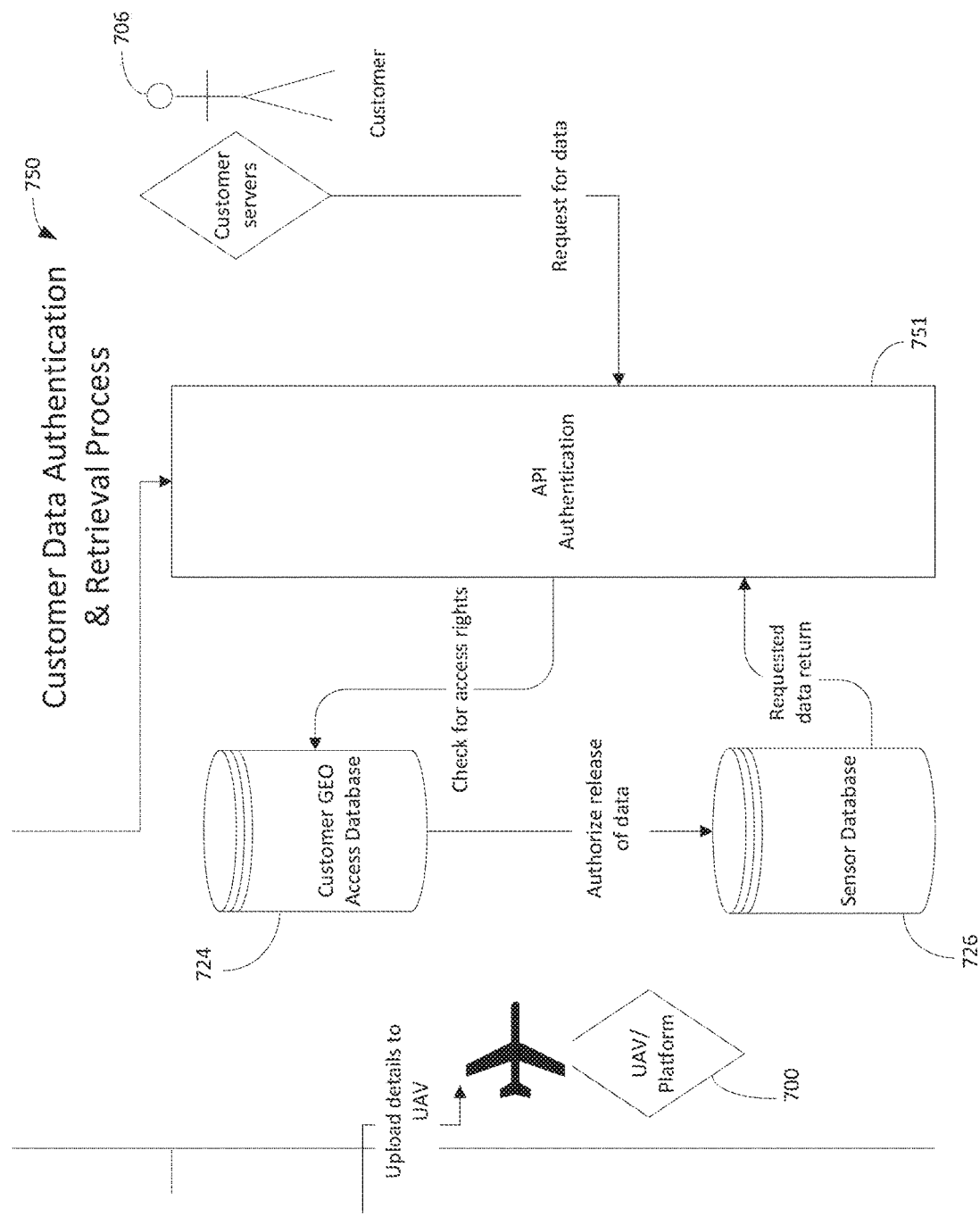

SYSTEMS AND METHODS FOR UNMANNED VEHICLE MANAGEMENT

CROSS REFERENCE TO RELATED APPLICATIONS

This application claims priority to and is a continuation of U.S. patent application Ser. No. 14/873,810 filed Oct. 2, 2015 and issued on Oct. 16, 2018 as U.S. Pat. No. 10,102,590, and which claims priority to and the benefit of U.S. Provisional Application No. 62/058,990, filed Oct. 2, 2014, and U.S. Provisional Appl. No. 62/108,137, filed Jan. 27, 2015, U.S. Provisional Appl. No. 62/140,107, filed Mar. 30, 2015; and U.S. Provisional Appl. No. 62/148,823, filed Apr. 17, 2015, the contents of each of which are incorporated herein in their entirety.

BACKGROUND

When a customer of an insurance company needs to exercise a claim in their policy, anything the insurance company can do to accelerate the customer's reimbursement helps not only the customer but also the insurance company in terms of closing matters as quickly as possible. This can be particularly important after natural disasters, such as a hurricane or earthquake, which may impact a high number of the insurance company's customers.

This disclosure relates at least in part to identifying how unmanned vehicles can operate in restricted areas, and this disclosure also related to facilitating claims processing, and in particular, facilitating claims processing that utilizes unmanned resources, such as unmanned vehicles.

SUMMARY

Disclosed herein is process of unmanned vehicle management. For example, management by unmanned vehicles after catastrophes or events causing widespread damage to support an insurance claims process or other entity processes. Described herein are systems and methods for facilitating claims processing, such as by utilizing unmanned vehicles. The vehicles can be terrestrial, aerial, nautical, or multi-mode. They can be remotely piloted, operate with an autopilot, or a combination of both. This process may serve the diverse data needs of multiple entities, with only a single entity engaged in the execution of the mission. This is so that coordination can be centralized, the safety of other operations, people and property can be maximized, and the effort to gain authority to operate is streamlined.

In one exemplary use, the gathering phase of the process begins by receiving requests from the interested consumers as to the type of information desired (e.g., type of sensor data, acquisition frequency, area of interest, etc.). This information is used in the process step to determine the necessary mission to satisfy the consumers. The priorities of the vehicle deployments are ranked based on the value attributed to the mission. Deployments are coordinated with the governing entity and executed to collect the data. During the gathering phase the original mission may be modified based on new inputs from customer's, or based on analysis of the data conducted during the mission that indicates the current or subsequent vehicle deployments can be altered to more effectively and efficiently complete the mission.

Described herein are systems and methods for facilitating claims processing, such as by utilizing unmanned vehicles. In one aspect, unmanned aerial surveillance (UAS), such as an unmanned aerial vehicle, is utilized to gather data related to one or more insurance claims. The UAS may be sent on a mission to gather data over an area that has recently been subject to an event that caused widespread damage (e.g., hurricane). The UAS may process the data internally before forwarding the data to a central server, and the data may be forwarded during the mission, and/or after the mission is complete. The data from the UAS may be shared between multiple entities and utilized to initiate and/or accelerate processing of claims against insurance policies.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

So that those having ordinary skill in the art, to which the present invention pertains, will more readily understand how to employ the novel system and methods of the present invention, certain illustrated embodiments thereof will be described in detail herein-below with reference to the drawings, wherein:

FIG. 7E illustrates an exemplary customer data authentication and retrieval process of FIG. 7A.

A component or a feature that is common to more than one drawing is indicated with the same reference number in each of the drawings.

DETAILED DESCRIPTION OF ILLUSTRATIVE EMBODIMENTS

Figure 1:
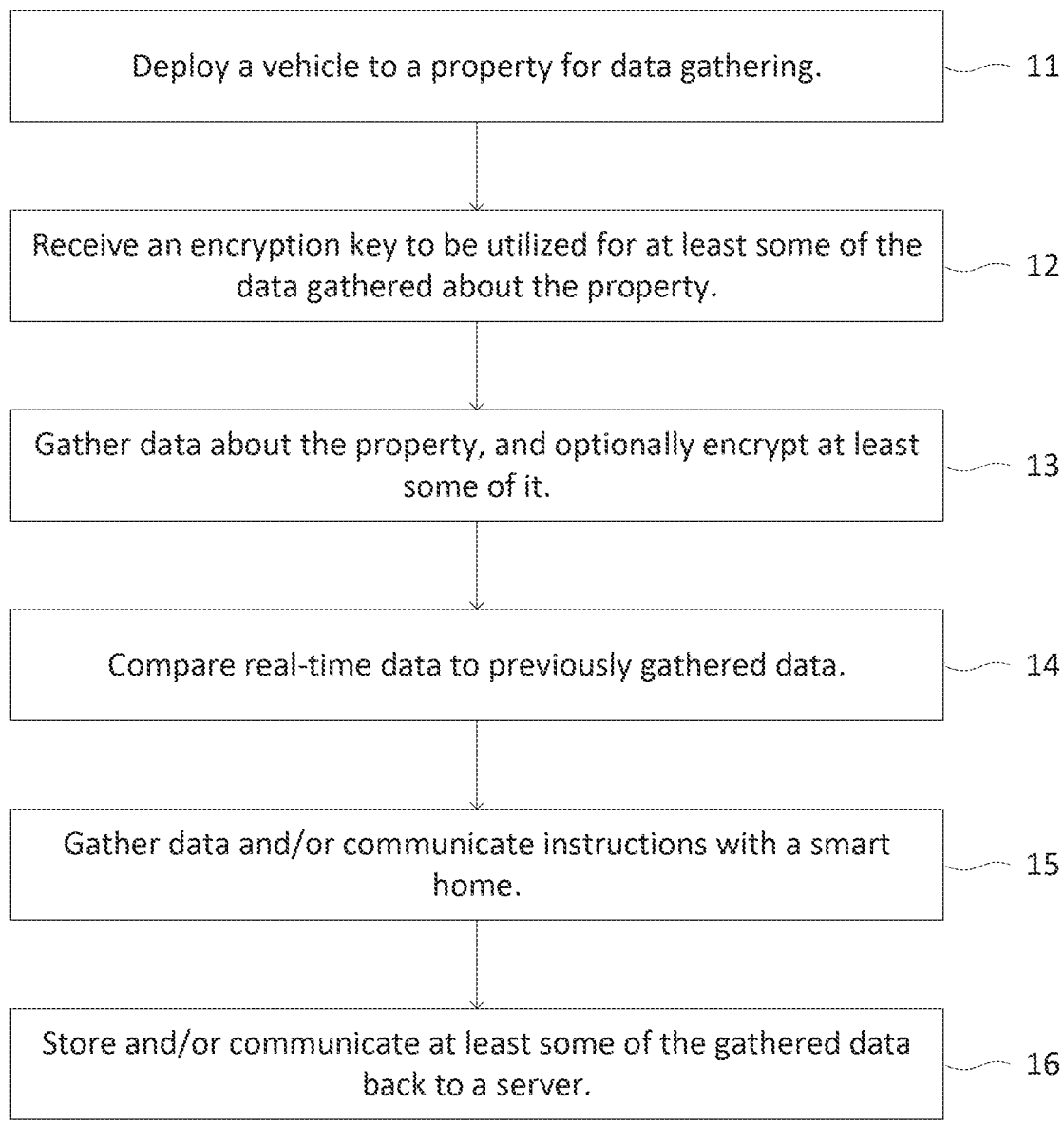
FIG. 1 is a flowchart depicting illustrative operation of one or more embodiments described herein.

The present disclosure is directed to claims processing, such as may be facilitated by utilizing unmanned aerial surveillance. It is to be appreciated that this disclosure is described below more fully with reference to the accompanying drawings, in which illustrated embodiments are shown. The present disclosure is not limited in any way to the illustrated embodiments as the illustrated embodiments described below are merely exemplary of the disclosure, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present disclosure. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

It is to be appreciated that certain embodiments of this invention as discussed below are a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the disclosure is not to be limited by what has been particularly shown and described, except as indicated by the appended claims. Further, although at least one series of steps are presented as an exemplary method of practicing one or more embodiments described herein, it will be appreciated by those skilled in the art that the steps identified may be practiced in any order that is practicable, including without limitation the omission of one or more steps.

A First Contemplated Embodiment and/or Use Case:

Turning now to FIG. 1, illustrated therein is a process 10, for using one or more embodiments described herein. Starting at step 11, a vehicle is deployed to a property. This deployment may be in response to a notification that the property has been damaged (e.g., the property owner contacted his/her insurance company), or this deployment may be in response to an event that caused damage in and around the property (e.g., a nearby tornado), and/or this deployment may be simply a periodic deployment to gather additional information.

Next, at step 12, an encryption key may be received, such as at the vehicle, and the encryption key may be utilized to encrypt at least some of the data gathered about the property, and at step 13, data about the property may be gathered and optionally encrypted. For example, using the private key/public key encryption system exemplified by the RSA algorithm, either the public key or the private key (preferably, although not necessarily, the public key) may be sent to the vehicle. In response, as the vehicle gathers data that pertains to the property (e.g., an image that at least partly includes the property), the vehicle may encrypt that data. It is contemplated herein that the entire data (e.g., the entire image) may be encrypted as a result of the property being included in the data (e.g., image), and it is also contemplated herein that only the part of the data (e.g., image) that includes the property may be encrypted (e.g., the parts of the data not related to the property may be cropped out of the data, thus leaving only property-related data to be encrypted).

Next, at step 14, previously gathered data (e.g., from a previous day/week/month/year) may optionally be compared to real-time gathered data. This comparison may enable the identification of a part of a structure that may be left. For example, if the real-time image discloses some rubble and/or one or more walls of a structure, the comparison to the previously-gathered image may reveal that the structure at that location has been partially and/or (almost) completely destroyed.

Subsequently, communications between the vehicle and a smart home system may be executed (step 15). It is contemplated herein that the smart home system may be any type of electronic-based system that is involved with managing/monitoring/controlling a property. For example, a smart home system may be any system that monitors what appliances are being operated, what the conditions are (what rooms have movement, what temperature each room is), and/or actually controls aspects of the structure (e.g., if no one is home, reset the thermostat to a temperature that is less expensive to maintain). Further, although the terminology "smart home" is used within this paragraph and disclosure, it is contemplated herein that the property/structure management system may be for any residential, commercial, and/or industrial property as would be recognized by those skilled in the art.

Finally, data may be communicated back to a (central) server (step 16) and/or a cloud service. For example, the vehicle may communicate via its own communication means (e.g., via a satellite link) back to the server. In another example, the vehicle may leverage a communication link with a smart home to send data to a server (e.g., the vehicle may send the data to the smart home, and the smart home could utilize its own communication means (e.g., its own ISP (Internet Service Provider)) to forward the data along).

It is contemplated herein that the data gathered about the property may be any data as described herein, and gathered from any of the sensors that are also described and referenced herein. Further, the vehicle may be enabled with functionality to analyze gathered data (e.g., an image) and determined whether the image sufficiently contains what is needed. For example, if the vehicle has been tasked with identifying the status of a residential home, and the vehicle gathers a visual image of the home from a relatively large distance (e.g., 1,000 feet), the image may be analyzed to determine that a closer and/or more zoomed-in image is needed to enable the functionality and analysis related to identifying what damage, if any, has occurred to the home.

Further, after the data is gathered, that data may be encrypted, stored, and/or shared according to various criteria. In one example, the vehicle may be deployed and instructed to gather information about a plurality of homes that are insured by three companies: Company A, Company B, and Company C. In this example, each of those companies may purchase and/or be entitled to certain services related to the vehicle's operation. For exemplary purposes only and without limitation, they may purchase an amount of data to be gathered and analyzed by the vehicle, they may purchase an amount of storage space that the data relating to the company's properties may be stored in, and/or they may purchase an amount of communication bandwidth that the data relating to the company's properties may be communicated over. With respect to that last example, it is contemplated herein that the purchased bandwidth may relate to a total amount of data to be communicated (e.g., a total of 10 GB), an amount of real-time bandwidth (e.g., 5 Mb/second (this example is of five mega-bits (hence the lower-case "b") per second)), a total amount of data bandwidth per communication means (e.g., 2 GB per satellite link, 1 GB per smart home network daisy-chaining), an amount of real-time bandwidth per communication means (e.g., 1 Mb/second for a satellite link, 0.25 Mb/second for smart home network daisy-chaining), and/or any other communication limitations and management as may be contemplated by those skilled in the art.

Continuing with these examples with respect to purchased data storage space and/or purchased bandwidth, it is contemplated herein that gathered and/or encrypted data may be deleted if the available storage/communication means is insufficient (e.g., if there is no storage space left and/or there is a reduced amount of storage space, then that the remaining space cannot be allocated for the image based on the image's calculated expected value to the company as compared to the amount of storage/communication bandwidth left (e.g., if the image is only kind of valuable and revealing about the conditions of the property, and the limited amount of storage space/bandwidth is insufficient to justify keeping an image of such limited value)).

In another example, the vehicle could communicate with a computing device that manages, at least in part, a structure on the property (e.g., a smart home). It is contemplated herein that the communication means may be via Wifi, Bluetooth, radio frequency, and/or any means as would be known and recognized by those skilled in the art. Continuing in part with the example above where three companies have tasked the vehicle to collect information about properties that the companies insure, for this example the vehicle may be communicating with a smart home that is insured by Company A.

It is contemplated herein that Company A may enable communications between the smart home and the vehicle by communicating to each that Company A authorized those two devices to communicate (secure) information. For example, Company A may supply the vehicle with a password/PIN that the vehicle can supply to the smart home to tell the smart home that the vehicle is authorized to learn about the smart home, and optionally even instruct the smart home to perform certain actions (e.g., change the thermostat, turn off the water/gas). In another example, Company A may communicate to the smart home (e.g., via the home's ISP) that the vehicle (which may be uniquely identified) is sent on Company A's request, and therefore the smart home should communicate (fully) with it.

In another example, particularly sensitive data (e.g., an access code to a home's security system) may not be communicated, such as to a cloud computing data storage facility, and instead the data may be kept on the vehicle and only a reference to the sensitive data may be communicated and externally stored. Thus, this information has a reduced accessibility to potential hackers.

In another example, the vehicle may analyze data about a property (e.g., an image) to determine that additional data may be required. As a result, the vehicle may instruct and/or request a second vehicle to gather the additional data. It is contemplated herein that the instruction/request may be communicated directly from the first vehicle to the second vehicle, and/or it may be via the first vehicle communicating that additional data is needed, and that request being forwarded to a second vehicle that has been identified as a result of the need for additional data.

In another example, the vehicle may identify a problem and instruct the smart home to address that problem. For example, the vehicle may identify that gas is leaking (e.g., via visual detection of a problem with a pipe, via detecting the gas in the air), and instruct a smart home to shut off (e.g., an emergency shut off) the gas. Further, it is contemplated herein that this may also be applied to leaking water and/or any other problem that the smart home may be leveraged to mitigate the possibility of additional damage being caused because of that.

In one embodiment, a third party operates, manages, and/or controls unmanned vehicle 100 and/or server 150, and distributes the data generated and developed therefrom to the one or more providers 160 that are associated with the property to which the data and/or the subset(s) of the data relate.

In another embodiment, providers 160 gather data and send the data to a pool, from which the data is culled and distributed to the one or more providers to whom the distributed data is pertinent and/or relates. The providers 160 may need to authenticate that they have a policy that covers the item to which the data relates, and/or the providers 160 may need to authenticate that the location (e.g., GPS) of the item (e.g., home) about which they are requesting information.

In another embodiment, determination of which providers 160 are allowed to deploy vehicles 100 to an area may be at least partially based on the amount of area about which information needs to be gathered.

In another embodiment, a first set of data is gathered (e.g., zoomed out optical imagery), and from that data it is analyzed and determined a priority of what property needs more data gathered therefrom (e.g., if damage is still occurring to a property (e.g., an active fire burning a part of the house) then gathering more data about the property's instant damage state may prove useless as the property will likely end up being additionally damaged, and thus, said property should be a low priority about gathering additional data at this time).

In another embodiment, tiers of data are collected, such as, for exemplary purposes only and without limitation, visual light imagery data, hyperspectral imagery data, infrared data. Said tiers may be handled, distributed, and/or analyzed alone or in combination.

In another embodiment, unmanned vehicle 100 may take imagery that is analyzed to determine if a house has sustained structural and/or roof damage. For example, the engines on unmanned vehicle 100 and/or engines on server 150 may analyze the data (e.g., imagery) to determine if a roof at a certain coordinate has all of the corners and edges and whether said corners and edges of said roof appear to be damaged. In another example, the engines on unmanned vehicle 100 and/or engines on server 150 may analyze the data (e.g., imagery) to determine the extent of damage that has occurred (e.g., the percentage of damage to a component (e.g., roof) of a home, the percentage of damage to an insured entity (e.g., a home), the percentage of damage to an area of homes). In this and/or other examples, the engines on unmanned vehicle 100 and/or engines on server 150 may determine and identify which item or items in a home are damaged (e.g., roof, walls, windows, porch).

In another embodiment, unmanned vehicle 100 is deployed with data relevant to its mission (e.g., here is imagery from before the disaster, here are the coordinates of insured's property), and such data may be utilized by unmanned vehicle 100 to determine how to manage and/or alter the mission.

In yet another embodiment, data gathered by unmanned vehicle 100 may be compared and/or utilized in coordination with data gathered from other sources. For example, data may be utilized that is gathered from a "smart building" (a building, residential, commercial and/or industrial), such as via one or more sensors deployed on and/or near the smart building.

In another embodiment, sensors 145 are utilized to detect if electrical lines are hot (e.g., temperature-wise and/or by virtue of currency passing through them) and/or if there is a leak of a dangerous substance (e.g., natural gas).

Figure 2:
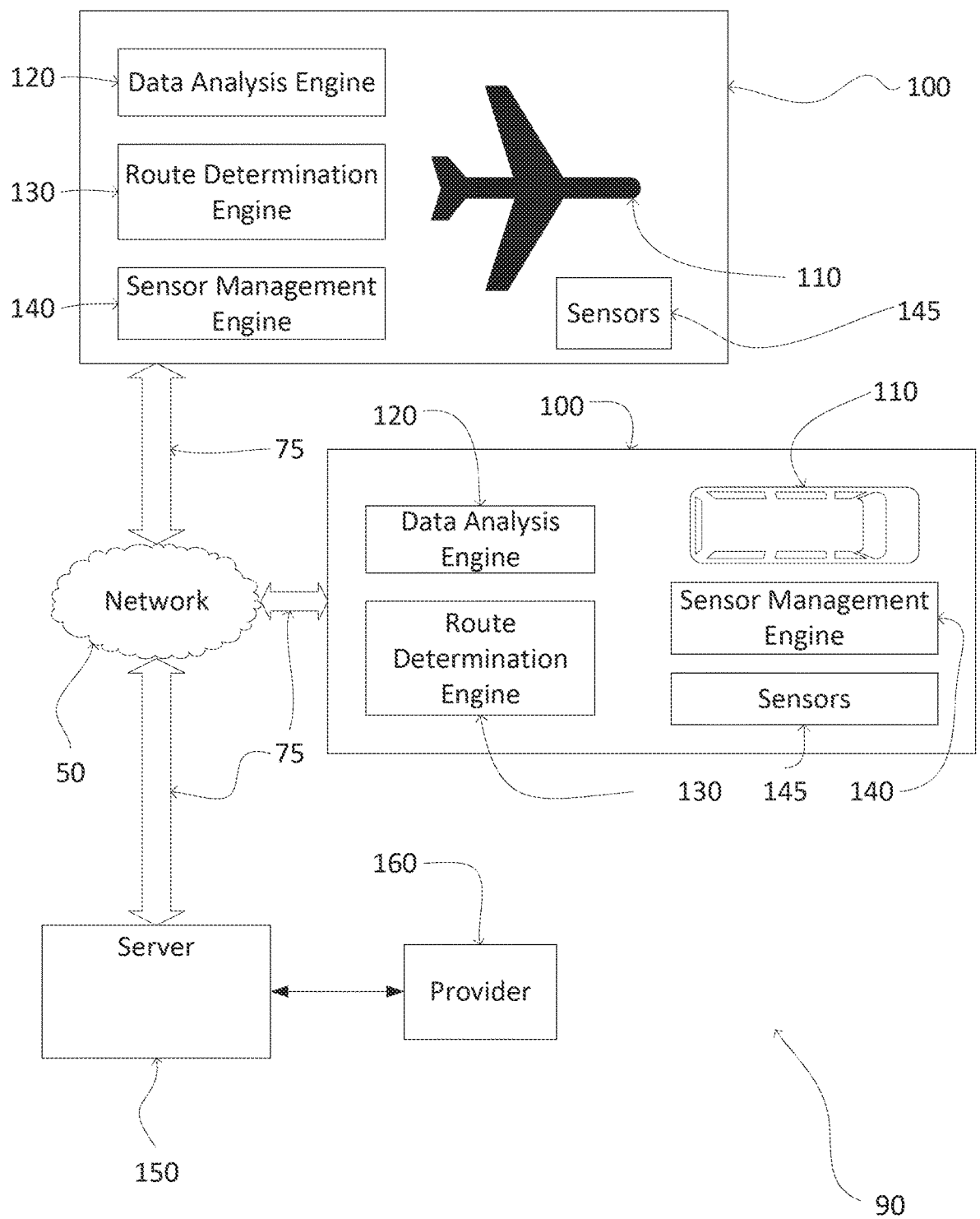
FIG. 2 depicts one embodiment of a system that may practice this disclosure.

One or More Other Contemplated Embodiments and/or Use Cases:

Referring to FIG. 2, disclosed therein is a system 90 in which the processes described herein may be executed. In one example, system 90 may include unmanned system 100, vehicle 110, data analysis engine 120, route determination engine 130 and sensor management engine 140. System 90 also includes network 50, communications 75, server 150, and provider 160, the last two of which are communicably connected.

Referring further to FIG. 2, it is to be appreciated that network 50 depicted in FIG. 2 may include a local area network (LAN), a wide area network (WAN), a personal area network (PAN), and/or combinations thereof. Such networking environments are commonplace in offices, enterprise-wide computer networks, intranets, and the Internet. For instance, when used in a LAN networking environment, system 90 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to system 90, or portions thereof, may be stored in a remote memory storage device such as storage medium. Computing devices may communicate over network 50 through one or more communications links 75 formed between data interfaces. Communication links 75 may comprise either wired or wireless links. It is to be appreciated that the illustrated network connections of FIG. 2 are exemplary and other means of establishing a communications link between multiple devices may be used.

Still referring to FIG. 2, data analysis engine 120 is utilized to receive, store, and analyze data retrieved by the one or more sensors 145 on unmanned system 100. Such analysis may include comparing imagery data to stored coordinates to identify additional and/or replacement imagery that may need to be gathered.

Route determination engine 130 is utilized to manage unmanned system 100 and confirm that unmanned system 100 remains on a planned mission path. Route determination engine 130 may also determine, based on gathered data and the results of data analysis engine 120 processing said data, modifications to the route of unmanned system 100. For example, if further imagery is needed of a certain location, or if imagery is needed from a different perspective and/or angle, route determination engine 130 may control and/or inform unmanned system 100 to vary the mission path accordingly.

Sensor management engine 140 controls the one or more sensors 145 installed on unmanned system 100. This control may include determining which sensors 145 are gathering data, the operating characteristics of said data gathering (e.g., the level of zoom of a visible light camera), where sensors 145 are aimed, and/or any other sensor performance control variables as would be recognized by those skilled in the art.

It is contemplated herein that sensors 145 may include a visible light camera, an infrared camera, a microphone to detect sound, a particle inspection device (e.g., a device that can detect what compounds are in sampled air gathered by unmanned system 100), radar emitting/detecting device(s), a spectrometer, a hyperspectral sensor, and/or any other sensors as would be recognized by those skilled in the art.

Figure 3:
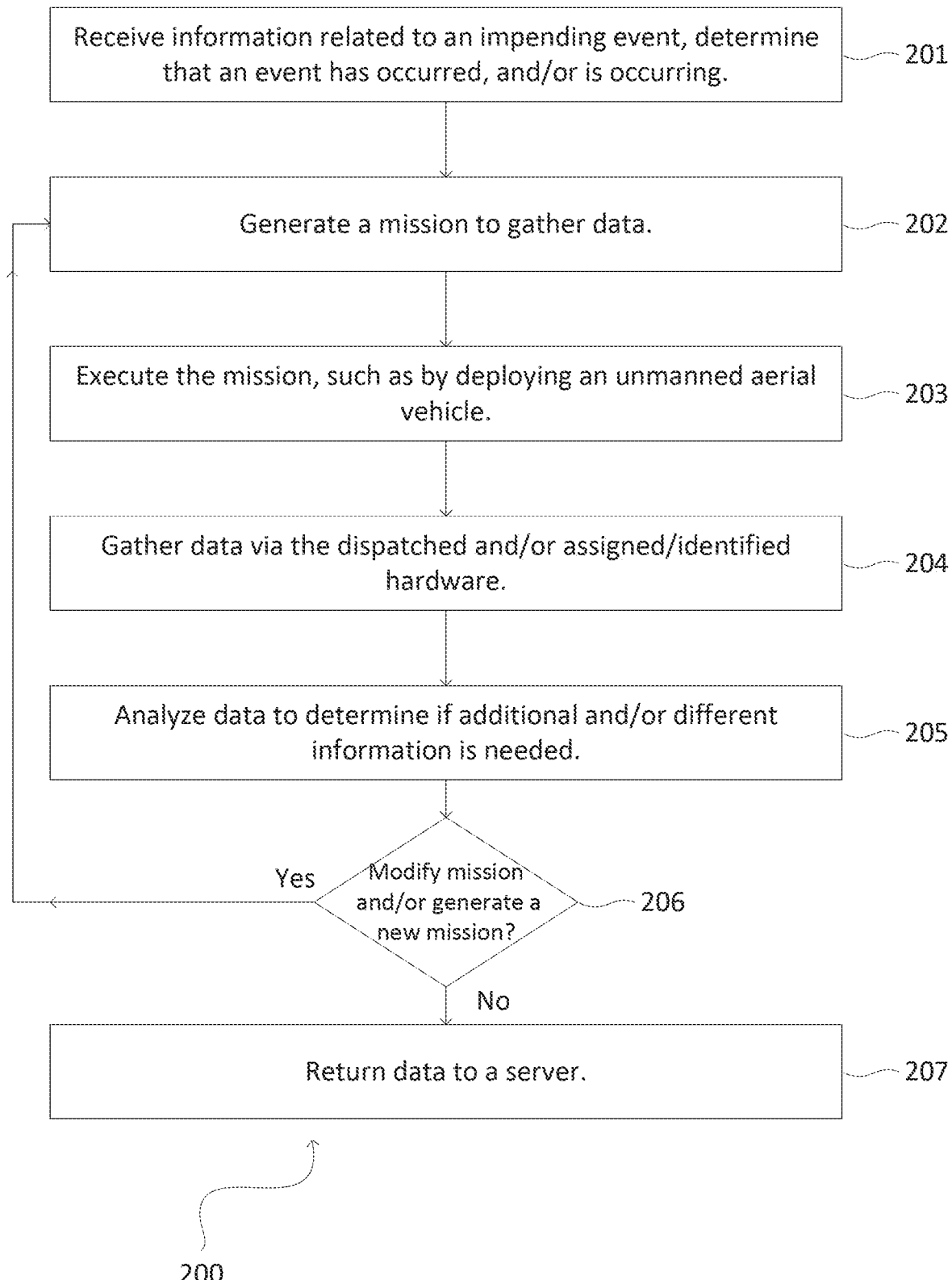
FIG. 3 is a flowchart depicting illustrative operation of the system of FIG. 2.

Referring to FIG. 3, exemplary operation of a process 200 of unmanned system 100 will now be described for illustrative purposes.

Starting at step 201, information is gathered that indicates that a mission should be generated. Such information may include, for exemplary purposes only and without limitation, that a local disaster has occurred (e.g., a tree fell on the house that is owned by someone with an insurance policy with provider 160), that a medium-scale disaster has occurred (e.g., a fire that spread between several houses on a street, of which one or more of the houses may be insured, but are not necessarily insured, by provider 160), a widespread disaster will and/or may occur soon (e.g., a hurricane is forecast to hit an area, a forest fire may engulf an area, an earthquake is about to occur, a volcano is about to erupt), a wide-spread disaster is occurring (e.g., a hurricane is over an area of interest to provider 160, an earthquake is currently occurring, a volcano is currently erupting, a fire, be it forest or other, is currently damaging/destroying one or more homes), and/or a wide-spread disaster has occurred (e.g., any of the events described herein).

Generally speaking, the event identified by the information relates to damage that may occur to one or more homes insured by provider 160. However, it is contemplated herein that the event may be unrelated to homes and/or property (real or personal) that is insured by provider 160.

Subsequently, a mission is generated to gather data (step 202). This mission may include deploying (step 203) an unmanned aerial vehicle (e.g., vehicle 110), a manned aerial vehicle, and/or any vehicle, be it manned, unmanned, aerial, ground-based, or otherwise. It is further contemplated herein that the mission may include identifying any other devices (e.g., satellite) that may be utilized to gather the required data. Although unmanned vehicle 100 is, as the name suggests, unmanned, it is contemplated herein any mechanical device may be deployed and utilized to practice the systems and methods disclosed and described herein. Further, it is also contemplated herein that a sensor 145, such as a non-moving sensor 145 or sensors 145, may be placed at or near the scene where a disaster has occurred and/or is expected to occur. For example, the sensor 145 may be placed on or near an expected path for a hurricane. The placement may be via a drop, an attachment to a building and/or structure (artificial and/or natural), or any placement as would be recognized by those skilled in the art.

Data is gathered via the one or more sensors 145 on unmanned system 100 (step 204). This data may be gathered by aiming sensors 145 (e.g., cameras for visible light, cameras for other wave lengths), adjusting a zoom factor for sensors 145 (e.g., zooming the camera(s) in or out), coordinating an amount of time to gather data (e.g., continuously for digital imagery, length of exposure for still imagery, amount of air to be gathered to be tested according to a particulate sensor 145), and/or other sensor controlling means as would be recognized by those skilled in the art.

The data is then analyzed, such as by comparing the imagery to a map grid stored in unmanned vehicle 100, mapping the imagery to the map grid, determining that additional imagery is needed (e.g., a more detailed image and/or video), and indicating to unmanned vehicle 100 that said additional imagery is needed. It is contemplated herein that said analysis may be conducted via one or more engines on unmanned vehicle 100, via server 150 on the ground, via server 150 located in another vehicle (be it unmanned, manned, aerial, or grounded), and/or a combination thereof. Thus, it is contemplated herein that, while deployed, unmanned vehicle 100 may be in communication with server via radio waves, via satellite communications, via WiFi, any other communications now known or to be developed, and/or any combination thereof.

In one embodiment, providers may pay a fee for analysis of properties insured by providers to be analyzed on unmanned vehicle 100 rather than having to be analyzed via the ground systems. Not only would this allow for faster processing and utilization of the resultant analysis, but if network connectivity to the ground is absent and/or inconsistent, this would allow for the provider to position unmanned vehicle 100 to gather more useful information for the provider's properties. In another embodiment, the flight path and/or the prioritization of what properties to image and/or process may be based on what type of disaster has occurred. Via step 206, the existing mission may be modified and/or a new mission may be generated and executed. This decision may be based on data that is being gathered (and the analysis thereof), new commands and/or requests sent to the vehicle 110, and/or combinations thereof. Alternatively, and/or in combination with analysis of the data, the data may be returned to server 150 (step 207).

Figure 5:
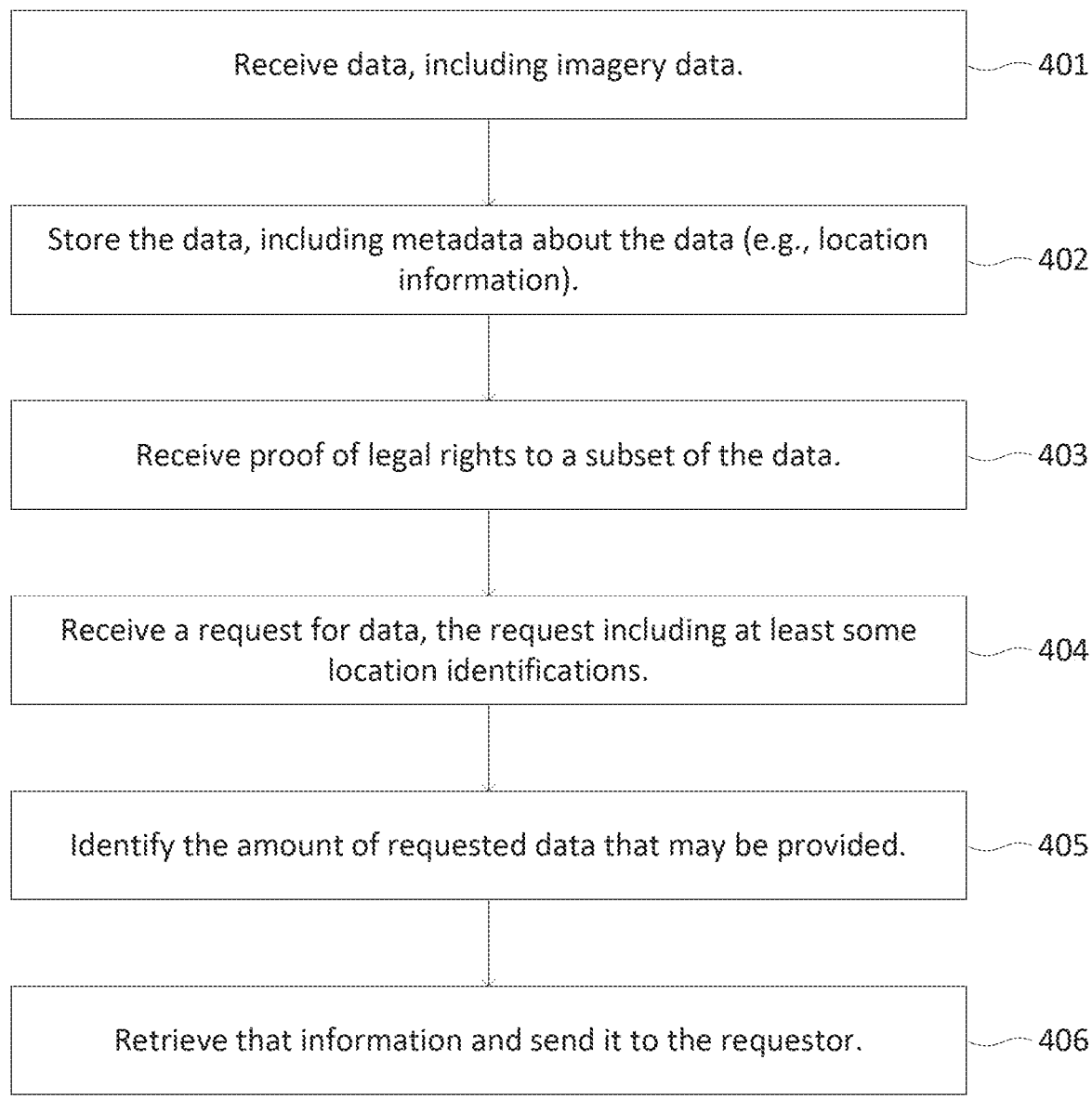
FIG. 5 is another flowchart depicting another illustrative operation of the system of FIG. 2.

Turning now to FIG. 5, illustrated therein is an exemplary method 400 of storing, retrieving, and distributing data. Starting at step 401, data, such as imagery data, is received. The data may have been generated by one or more sensor 145, and in one or more embodiments the data is stored with metadata that identifies what type of sensor gathered the data, the location (e.g., via GPS) of the vehicle that gathered the data, the location (e.g., via GPS and calculations dependent therefrom) of one or more objects in the image, and/or the day/time the data was gathered, stored, analyzed, and/or retrieved. Subsequently, the data (and metadata) is stored (step 402). For example, every quantum of data (e.g., every pixel) may have a location (e.g., a geographical location) associated with it.

At some point, an entity (e.g., an insurance company) supplies information that represents an amount of proof that the entity has legal rights to view/utilize at least a subset of the data (step 403). In FIG. 5, that step is represented as occurring after the data is stored, but it is contemplated herein that this step, and indeed any step in the exemplary methods described herein, may be practiced in any practicable order of steps as would be recognized by those skilled in the art.

Next, a request for data is received from the entity (step 404). The step preferably includes at least some information identifying which data is being requested (e.g., the identifying information is location-centric). In response to receiving the request, responsive data is identified (step 405). The responsive data preferably is consistent with the request (e.g., the responsive data is from the location requested) and it is also confirmed that the requesting entity has legal rights to view/utilize the responsive data. For example, it is contemplated herein that the request may be for more data than the entity has yet proven they have a right to, so the responsive data identified and sent (step 406) is only the responsive data that the entity has a right to.

Figure 6:
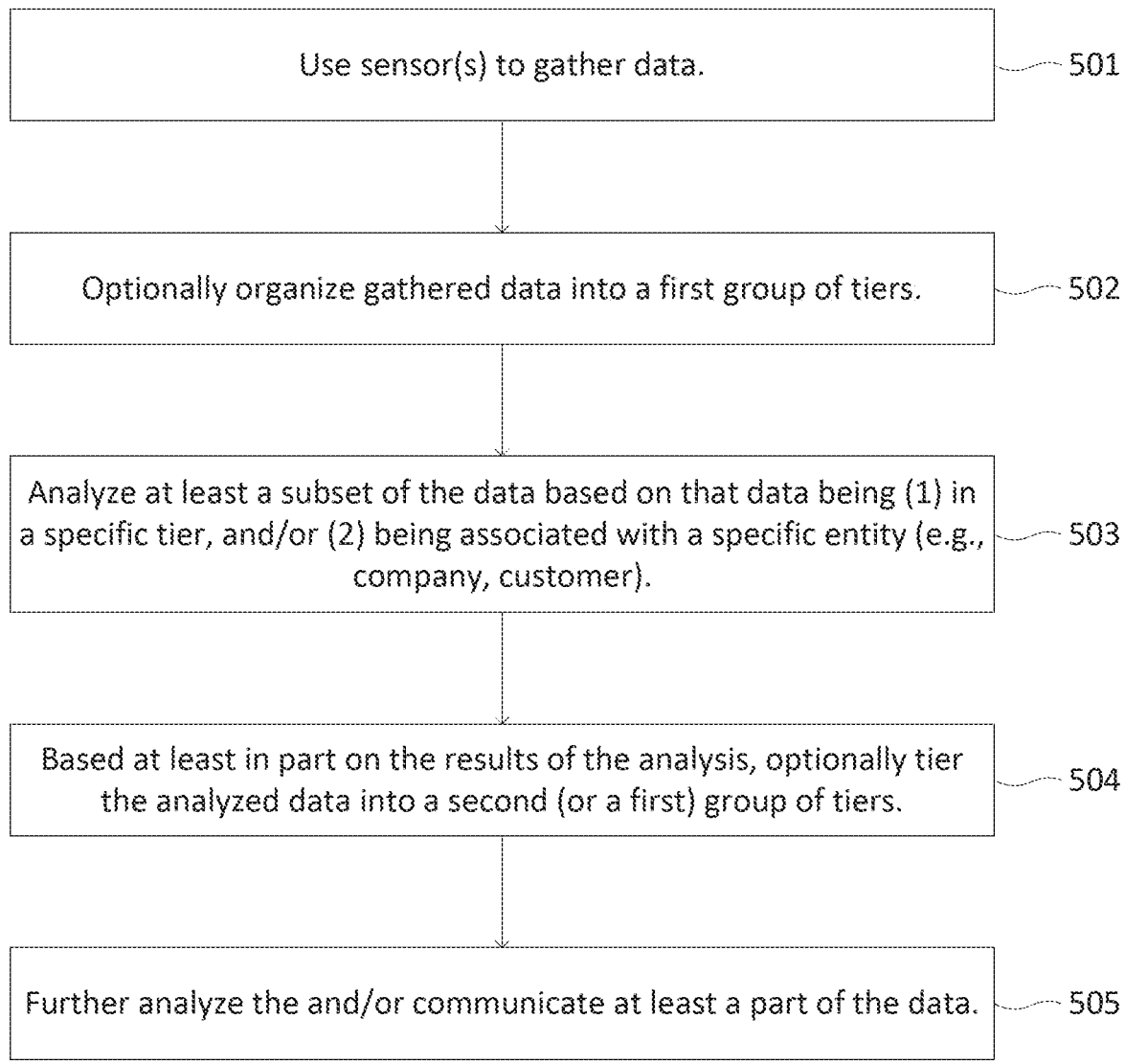
FIG. 6 is a third flowchart depicting yet another illustrative operation of the system of FIG. 2.

Turning now to FIG. 6, illustrated therein is an exemplary method (process 500) of at least part of the data processing described herein. Starting at step 501, data is gathered, and subsequently data may optionally be organized into a first group of tiers (step 502). However, it is contemplated herein that step 502 may not precede step 503 (i.e., because step 502 is prefaced by "optionally"). Via step 503, at least part of the gathered data, if not all of the gathered data, is analyzed. The selection of which data is to be analyzed, to the extent that only a subset of the data is analyzed, may be based at least in part on what tier that data is in and/or whether the data is associated with a specific entity (e.g., the data represents an object that may be insured by an entity insurance company). After this analysis, the data may optionally be tiered again (step 504), and finally the data may be analyzed again based on the tiering, and/or the data may be communicated to a party (e.g., the aforementioned "entity"). It is contemplated herein that the tiering of the data may result in varied analysis (e.g., different type of analysis, different level of detail for the analysis, different priority (e.g., timing) of the analysis). It is contemplated herein that the analysis may include converting imagery data into a textual representation of at least some of that data, detecting whether power lines are active (e.g., via thermal imaging, via magnetic field detection), whether a gas line is broken (e.g., via thermal imaging to detect a leaking gas of a different temperature than the background, via analysis of the gas(ses) in the air), and such analysis may be utilized to predict (and send appropriate warnings) regarding possible future damages and/or accidents that may be caused by one or more of these conditions.

In one embodiment, a buffer zone is established to keep unmanned vehicle 100 away from identified locations. Such locations may be homes of insured properties covered by provider 160, anyone's home, people and/or groups of people that may have been identified in the imagery, trees and/or other physical impediments, and/or smoke and/or other possible dangerous and/or interfering conditions. The buffer zone distance may be a predetermined distance that is set before the mission is generated, when the mission is generated, communicated to unmanned vehicle 100 during the mission, and/or generated by unmanned vehicle 100 in response to data analysis performed during the mission.

In another embodiment, unmanned vehicle 100 is deployed before an event occurs, such as a widespread disaster, in order to facilitate identification of what damage has been caused by the event and what damage was pre-existing.

In another embodiment, unmanned vehicle 100 sends data to server 150 and server 150 deletes sensitive data (e.g., imagery of people). It is further contemplated herein that server 150 may act in coordination with a plurality of providers 160, and server 150 may forward on to each provider 160 data that is pertinent and/or related to an insurance claim that has been or may be made against a policy associated with that provider. In this exemplary embodiment, a single entity (e.g., a neutral party and/or a government affiliated party) organizes and/or is involved in the deployment of a vehicle 110, and insurance provides interact with that single entity to obtain their information (to which they are entitled).

For example, unmanned vehicle 100 may take images of individual pieces of property (either real property or personal property), and the individual images may be sent to the provider that has an insurance policy covering that piece of property (and where no provider covers that property, said image may be deleted). In another example, unmanned vehicle 100 may take an image that includes multiple pieces of property (be it real and/or personal property). This imagery may be sub-divided into sub-components, each of which are exclusive either to (1) a single provider (e.g., the image may include a plurality of property items but each of which is associated with the same provider, and/or (2) a single piece of property, either in whole or in part (i.e., in this example, the image may be entirely of a single property item or it may be a portion of the single property item).

In another embodiment, unmanned vehicle 100 uploads data instantaneously (or nearly so).

In another embodiment, unmanned vehicle 100 analyzes all and/or some of the data before uploading it to server 150.

In another embodiment, unmanned vehicle 100 is equipped with a possible surplus of sensors 145, of which only some of which may be utilized on a given mission. In another embodiment, unmanned vehicle 100 is dynamically equipped with sensors 145 based on the parameters of the mission. In another embodiment and/or use case, the types of sensors 145 selected are determined at least partially based on the type of event that has occurred (e.g., if the event is a flood from a river, then sensors 145 that gather hyperspectral imagery may not be included on vehicle 100).

In another embodiment, data is streamed via LTE, wifi, and/or any networking means as would be recognized by those skilled in the art. In another embodiment, data is streamed via one or more unmanned vehicles 100 communicating and/or relaying information to a communication station for one another.

In another embodiment, a plurality of unmanned vehicles 100 may be assigned to a single airspace that is related to and/or is over the site of an event such as a widespread disaster.

In another embodiment, a plurality of unmanned vehicles 100 are assigned to a plurality of airspaces that may be assigned, and said airspaces may be exclusive of each other (or they may not be exclusive of each other). It is contemplated herein that airspaces may be exclusive of each other via geographical coordinates (e.g., the x-axis and/or the y-axis) and/or via altitude (e.g., the z-axis).

In another embodiment, the engines related to specific flight and safety control of unmanned vehicle 100 are separate from the engines that analyze the data (e.g., data analysis engine 120, route determination engine 130, sensor management engine 140).

In another embodiment, unmanned vehicle 100 may receive a request for data, and unmanned vehicle 100 may alter a flight path to gather the requested data, optionally confirm the gathered data matches the requirements of the request, and then communicate the requested data (such as to the requesting party).

In another embodiment, hyperspectral imagery is taken, utilized, and analyzed to determine information such as what kind of damage was sustained. For example, the engines on unmanned vehicle 100 and/or engines on server 150 may determine whether water damage was caused by salt water or fresh water (such may be utilized to determine if an insurance claim is characterized as flood or storm damage), and/or the extent of damage to a roof and/or a structure.

In another embodiment, a mission by an initial unmanned vehicle 100 may be utilized to dictate and/or inform what sensor(s) 145 should be installed on one or more (other) unmanned vehicles 100 for future missions.

In another embodiment, there is an order of deployment for unmanned vehicles 100, such as, first fixed wing craft, then multi-rotor or person or ground vehicle(s).

In another embodiment, unmanned vehicle 100 determines and relays and/or saves the location of other unmanned vehicles 100.

In another embodiment, a request is pushed to an insured to ask permission for unmanned vehicle 100 to deploy at or near property owned by the insured so as to enable and/or facilitate unmanned vehicle 100 gathering data about the insured's property.

In another embodiment, unmanned vehicle 100 includes artificial intelligence (AI) that performs risk analysis and which is utilized to inform and/or dictate the mission path of unmanned vehicle 100.

In another embodiment, unmanned vehicle 100 may be utilized to monitor an insured's property, such as after an insured's property (e.g., car) has been stolen.

In another embodiment, unmanned vehicle 100 may provide cell phone and/or satellite phone uplink and/or unmanned vehicle 100 could operate as a repeater to the same (and as such multiple unmanned vehicles 100 may be daisy chained together to provide communication abilities). Another network feature that may be included is that vehicle 100 may provide network connectivity, such as cell phone tower (e.g., by imitating a cell phone tower) and/or a Wifi network.

In another embodiment, unmanned vehicle 100 may include video streaming functionality. For example, if a claim is initiated by or on behalf of an insured (e.g., such as is described herein), an unmanned vehicle 100 (be it aerial or grounded or a combination of both) may be deployed to the insured and the insured may utilize unmanned vehicle 100 to perform video and/or audio communications with provider 150 and/or representatives associated therewith.

In another embodiment, unmanned vehicle 100 may provide a mobile ATM where currency distribution functionality has been (temporarily) disabled and/or undermined.

In another embodiment, unmanned vehicle 100 may be a parent unmanned vehicle 100 that has multiple child unmanned vehicles 100 that may dock with and/or be partially or completely controlled by parent unmanned vehicle 100.

In another embodiment, a damage model, such as a tornado-damage model, may be utilized to determine which areas around a tornado's path should be analyzed for possible damage, and therefore which areas to which unmanned vehicle 100 should be deployed.

In another embodiment, unmanned vehicle 100 may detect that a property (e.g., a house) has been completely destroyed and initiate the claims processing for that individual automatically, and/or unmanned vehicle 100 may send an image and/or message related thereto to the insured so that the insured can at least have the peace of mind of knowing their property was damaged and/or destroyed (limited though said peace of mind may well be).

In another embodiment, unmanned vehicle 100 may gather thermal imagery, which may be utilized to identify hail (or other) damage to a home's roof.

In another embodiment, unmanned vehicle 100 may be utilized for fraud detection. For example, if an insured reports that the insured's car's bumper has been fixed, one or more unmanned vehicles 100 may be sent and/or configured and/or requested to determine whether said repair actually was performed.

In another embodiment, data gathered from unmanned vehicle(s) 100 may be utilized to prevent and/or inform new policy enrollment decisions (e.g., "you can't get fire insurance now because the forest fire is next door").

In another embodiment, data gathered from unmanned vehicle(s) 100 may be utilized to for targeted marketing of non-impacted homes (e.g., "your neighbor had flood damage, so you should consider getting flood insurance").

In another embodiment, unmanned vehicle 100 could be deployed to an insured and/or a prospective insured's location and/or house to conduct, obtain and/or retrieve the necessary medical tests and/or samples (such as for enrollment, configuration, adjustment of health and/or life insurance policies).

In another embodiment, unmanned vehicle 100 may be utilized to generate models that predict how much damage is expected around a certain range of an event. For example, a tornado with speeds of 85 mph, at 250 yards the damage is expected to be total destruction, up to 500 yards the damage is moderate to heavy, etc.

In another embodiment, unmanned vehicle 100 may utilized monitor on-site damage to property (e.g., a corner of a building was damaged), detect that vegetation needs to be watered, and/or take imagery of a gathering such as a company party.

In another embodiment, a customer of an insurance company may sign up for a service (which may or may not be a service the customer has to pay for), that includes the customer's associated provider 160 monitoring property identified by the customer. For example, the customer may request an update from the provider if new data is gathered (e.g., new images from unmanned vehicle 100). In another example, the customer may request an update if analysis based on new data identifies one or more predetermined situations (e.g., that the amount of flammable brush within a predetermined distance to the customer's home has exceeded a threshold). In another example, the customer may request the provider 160 to monitor the customer's home because the customer is not home, in which case the customer may request that any detected changes result in an alert to the customer as well as a third party (e.g., the police).

In one exemplary use, the gathering phase of the process begins by receiving requests from the interested consumers as to the type of information desired (e.g., type of sensor data, acquisition frequency, area of interest, etc.). This information is used in the process step to determine the necessary mission to satisfy the consumers. The priorities of the vehicle deployments are ranked based on the value attributed to the mission. Deployments are coordinated with the governing entity and executed to collect the data. During the gathering phase the original mission may be modified based on new inputs from customer's, or based on analysis of the data conducted during the mission that indicates the current or subsequent vehicle deployments can be altered to more effectively and efficiently complete the mission.

The storage phase consist of pre-processing data during the mission for a first layer of processed information either on the vehicle processors or on other processors once the data has been transmitted from the vehicle. The location of the data storage can be accessed for upload from the mission components. The customers can access the stored data via application program interfaces. The data available to the individual customers is limited based on the policy previously defined for the customer.

The analysis phase can be conducted on the vehicle, or on other processors. The analysis conducted on the data is defined by the inputs from the customers. Analysis provides more actionable data compared to the raw data collected from the vehicle sensor. Since processing data on the vehicle will likely be more expedient, the priority of the analysis computation location will depend on the priority which is defined during the gathering phase of the mission, but can be altered during the mission based on new inputs from the customers. The fully processed data is stored with the raw data with access granted to customers based on their predefined policy. Sensitive data is compartmentalized for release only to entities that have authorization to access the stored data.

The distribution phase is governed by the data requests that come from the consumers, and the priority given to those requests. The customer, commercial or public entity, with a predefined policy with the operating entity requests the data via a communication channel of their preference. The interface between the customer and the stored data will be harmonized via a standard interface protocol. The customers will receive the requested data for their own use. The customers may also receive notifications that the data they have requested is available for download, or other mean of consumption. The data disseminated can contain digital tracking software so that policy of the consumer is maintained and enforced for their data. Meaning, an organization will not be able to further disseminate the data to alternate end-users not defined in their policy. This will mitigate secondary 'selling' of data or subsequent use of the data not previously agreed upon and enforce privacy for private property that was the target of the acquisition.

Figure 7A:
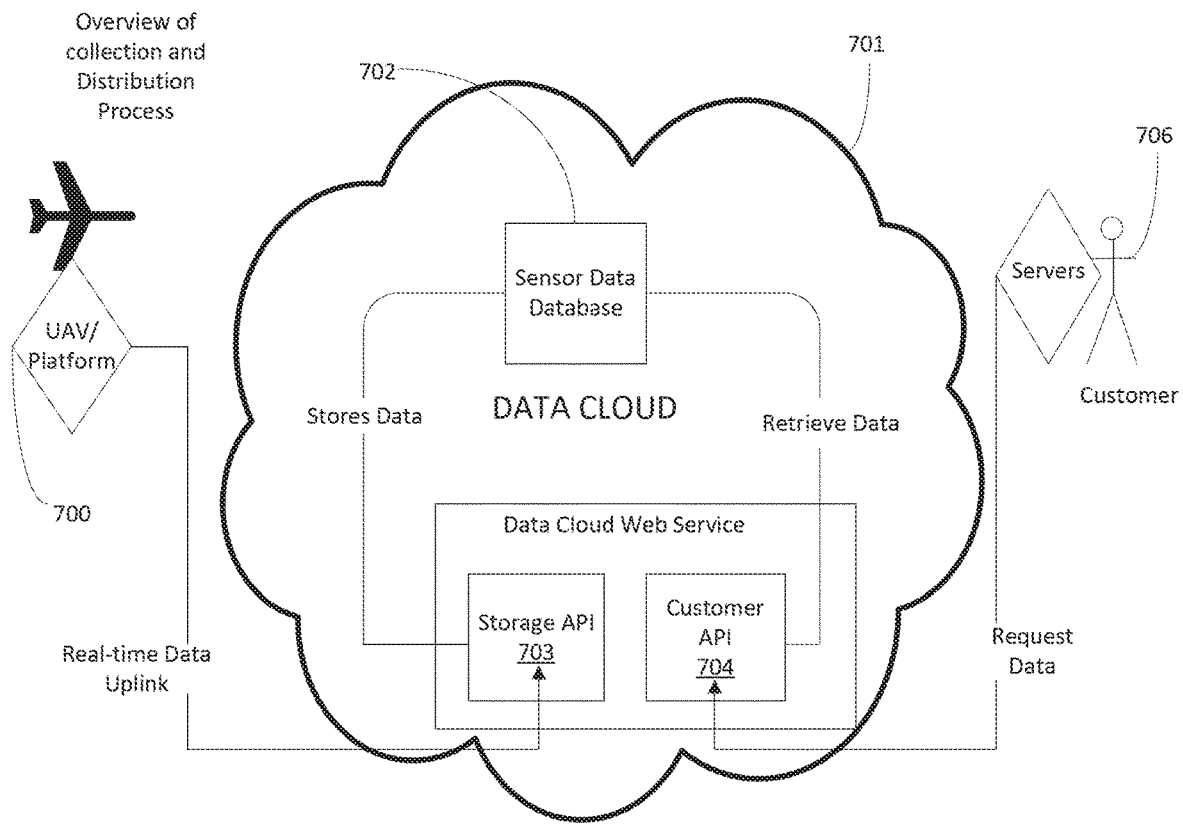
FIG. 7A illustrates an exemplary overview of the step gathering (collecting) phase and the distribution step.
Figure 7A:
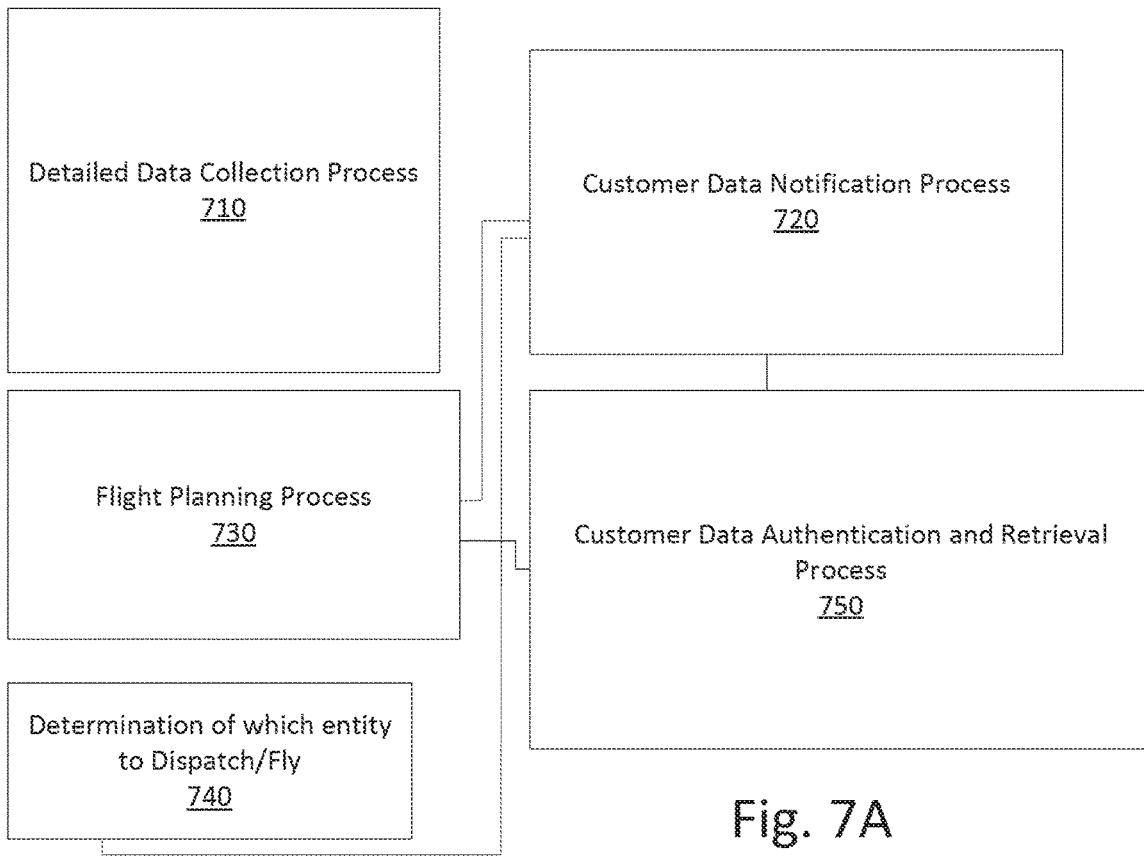
Figure 7B:
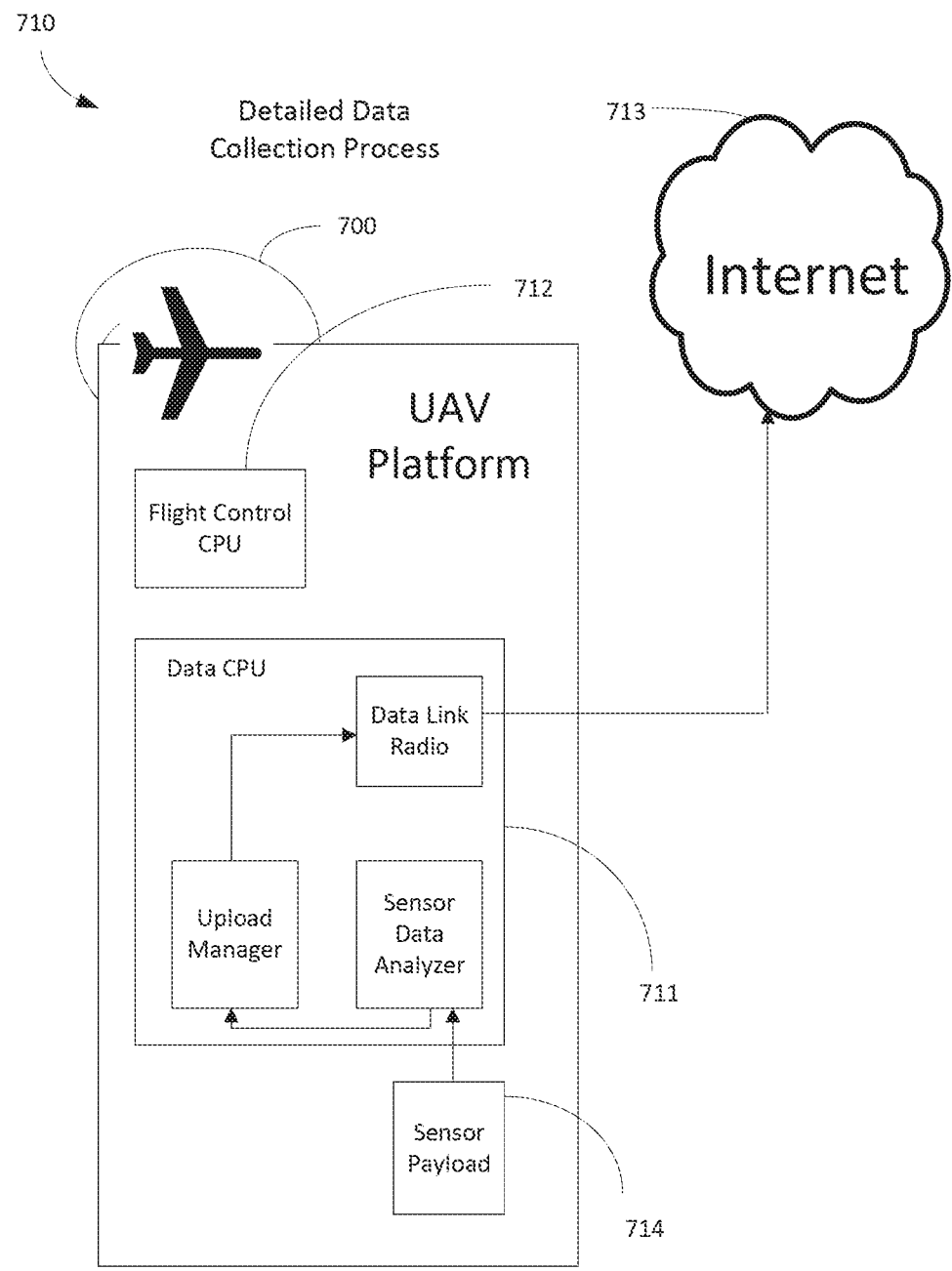
FIG. 7B illustrates an exemplary detailed data collection process of FIG. 7A.

FIG. 7A illustrates an exemplary overview of the step gathering (collecting) phase and the distribution step, among others. UAV 700 has a real-time data uplink to a storage application programming interface (API) 703 within a data cloud 701. Storage API 703 stores data in communicatively connected sensor database 702. Customer API 704 retrieves data from sensor database 702, which may be the result of a request of servers 706 of a customer. Other processes include detailed data collection process 710, customer data notification process 720, flight planning process 730, customer data authentication and retrieval process 750, and determination of which entity to dispatch/fly 740. FIG. 7B illustrates an exemplary detailed data collection process 710. UAV 700 may include flight control CPU 712, data CPU 711, and sensor payload 714. UAV 700 may be connected to a communications network, such as Internet 713. Data CPU 711 may include a sensor data analyzer (connected with a sensor payload), an upload manager, and a data link radio that connects with Internet 713.

Figure 7C:
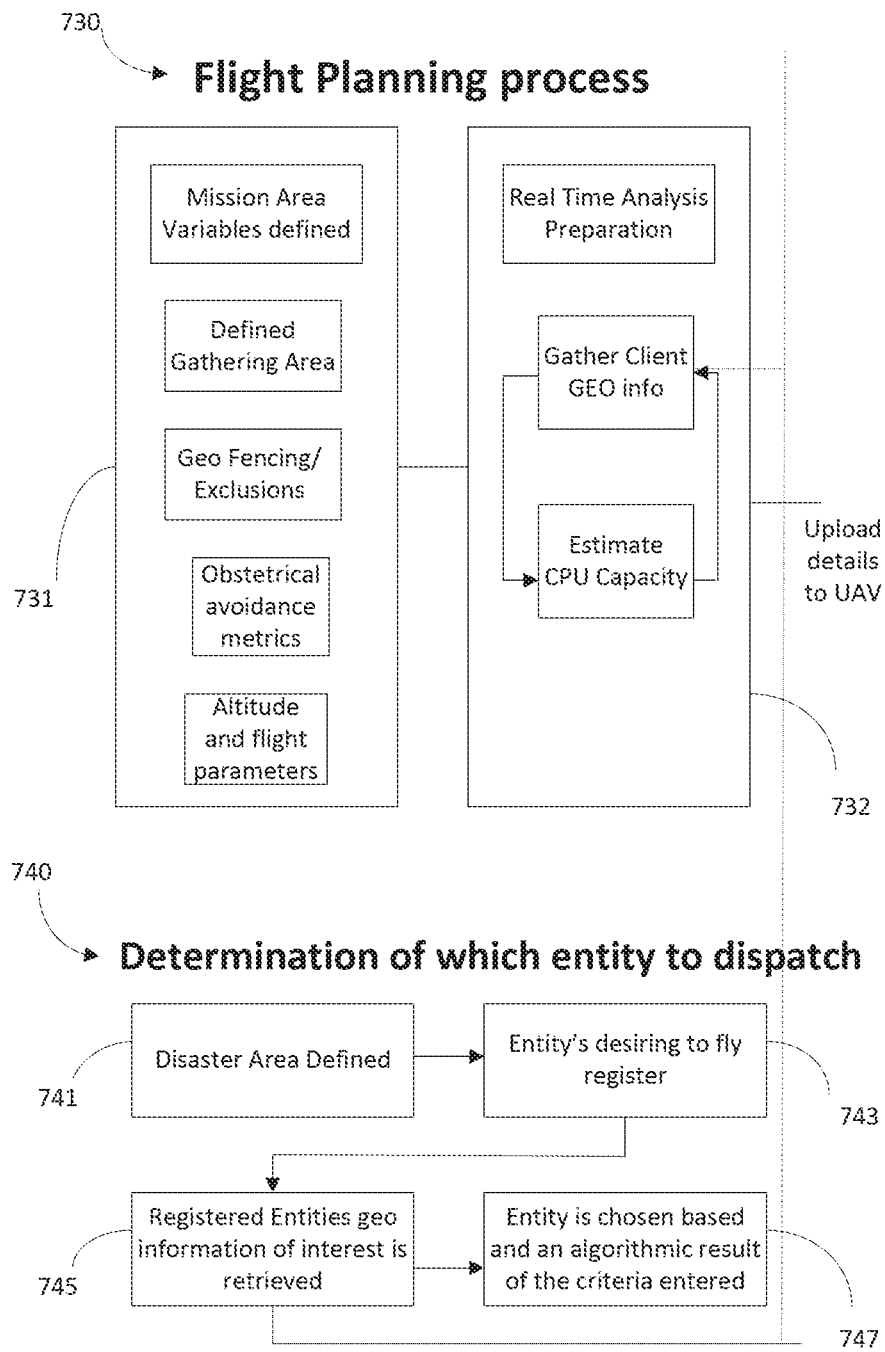
FIG. 7C illustrates an exemplary flight planning process of FIG. 7A.

FIG. 7C illustrates an exemplary flight planning process 730 and determination of which entity is dispatched process 740. Flight planning process 730 includes mission area variables defined 731 and real-time analysis preparation 732. Mission area variables defined 731 may include defined gathering area, geo fencing/exclusions, obstetrical avoidance metrics, altitude, and flight parameters. Real time analysis preparation 732 includes gather client GEO info and estimate CPU capacity. Gather client GEO info may be connected customer geo access database 724 of FIG. 7D. Real-time analysis preparation 732 connects with customer data authentication and retrieval process 750, which uploads details to UAV. Determination of which entity is dispatched process 740 includes the steps of defining disaster area (741), registering dispatched entity (743), retrieving registered entity GEO information of interest (745), and entity chosen based on algorithmic result of the criteria entered (747). At block 745, retrieving registered entity GEO information of interest (745) may be from customer Geo Access database 724.

Figure 7D:
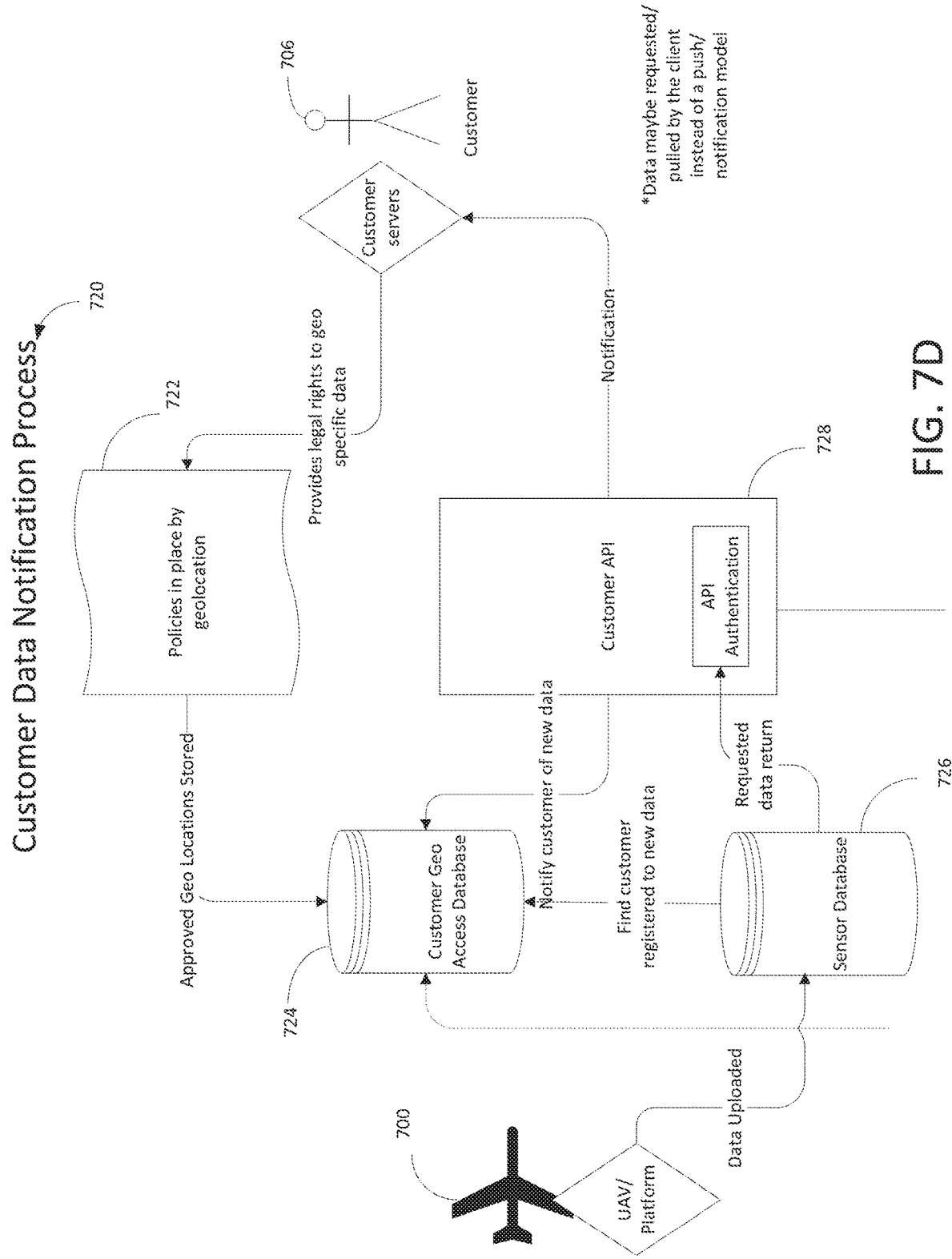
FIG. 7D illustrates an exemplary customer data notification process of FIG. 7A.

FIG. 7D illustrates an exemplary customer data notification process 720. Customer server 706 may provide legal rights to GEO specific data which are affected by policies in place by geolocation (722). Approved GEO locations may be stored in customer GEO access database 724. UAV 700 uploads data to a sensor database 726. Customer API 721 may include API authentication. Also customer API 721 may receive notifications of GEO related data and sensor related data as well as provide notifications to customer server 706.

FIG. 7E illustrates an exemplary customer data authentication and retrieval process 750. Customer server 706 may request data from API authentication 751. API authentication is connected with or associated with API authentication of FIG. 7D. API authentication 721 may check rights with customer GEO access database 724, which may send a message to authorize release of data to sensor database 726. Sensor database 726 may provide requested data to API authentication 751 and ultimately customer server 706.

Figure 8:
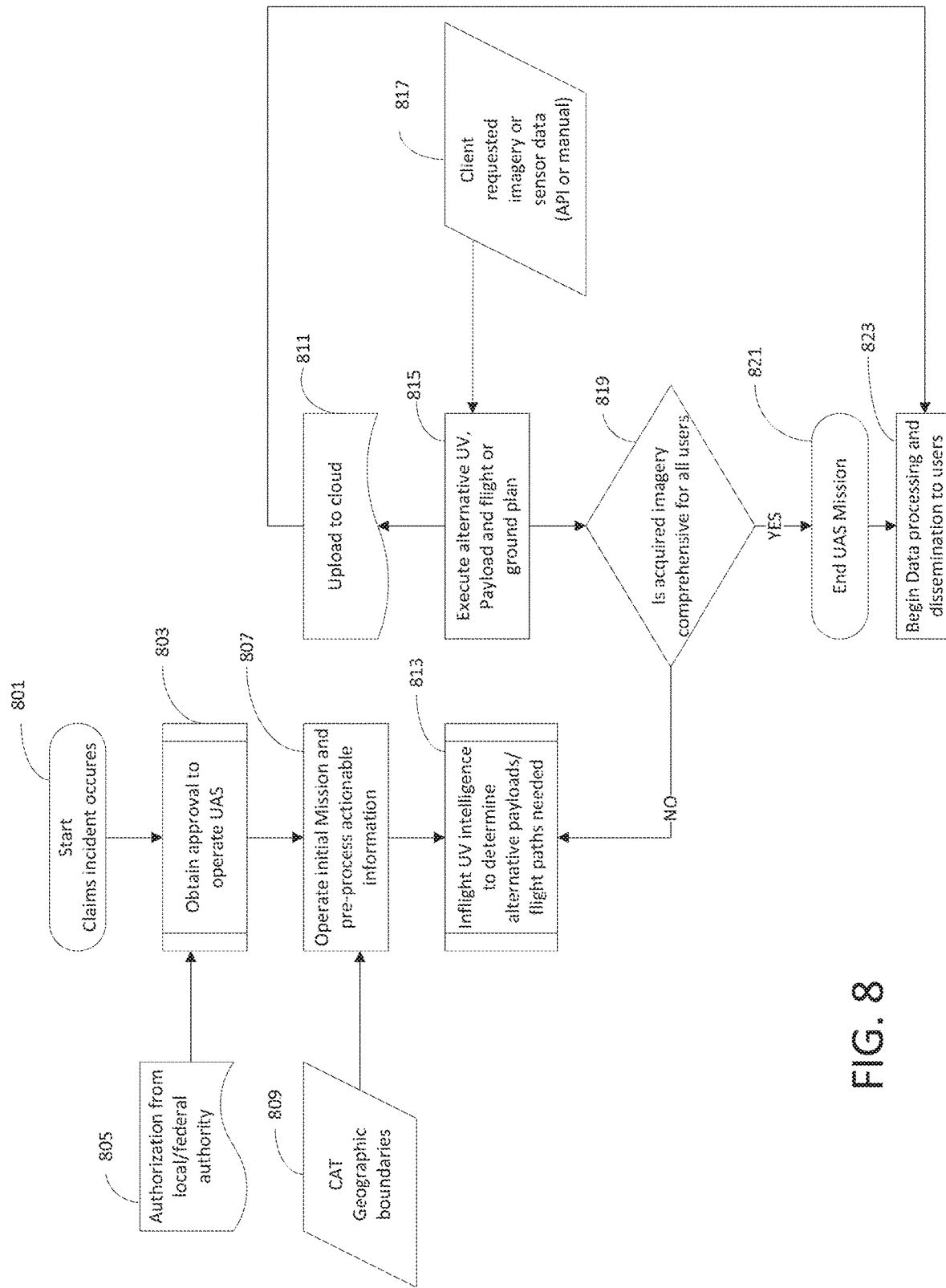
FIG. 8 illustrates an exemplary aspect of the gathering, storing, and mission modification process.

FIG. 8 illustrates an exemplary aspect of the gathering, storing, and mission modification process. At step 801, a claim incident occurs. At step 803, approval is obtained to operate unmanned aerial surveillance (UAS), which may be from a local or federal authority (805). At step 807, there is an operation of an initial mission and pre-processing of actionable information, which may include CAT geographic boundaries (809). At step 813, there may be in-flight UV intelligence to determine alternative payloads/flight paths needed. At step 815, there alternative UV, payload, and flight or ground plan may be executed, which may be based on client requested imagery or sensor data. At step 819, there is a determination of whether acquired imagery is comprehensive for all end users. If yes, then end UAS mission and begin data processing and dissemination to end users (823). If no, then go back to step 813. Step 811 provides for uploading data to a cloud, such as data related to step 807 or step 815. The uploaded data of step 811 may also be subsequently uploaded to step 823 with regard to processing and dissemination to end users after ending a UAS mission.

With continued reference to FIG. 8, described herein are systems and methods for facilitating claims processing, such as by utilizing unmanned vehicles. In one aspect, unmanned aerial surveillance (UAS), such as an unmanned aerial vehicle, is utilized to gather data related to one or more insurance claims. The UAS may be sent on a mission to gather data over an area that has recently been subject to an event that caused widespread damage (e.g., hurricane). The UAS may process the data internally before forwarding the data to a central server, and the data may be forwarded during the mission, and/or after the mission is complete. The data from the UAS may be shared between multiple entities and utilized to initiate and/or accelerate processing of claims against insurance policies. UAV on-board intelligence determines if other systems are necessary to more thoroughly assess types of damage in the return on investment (ROI). On-board intelligence can be augmented with decision made by clients reviewing the uploaded imagery or sensor data. Certain payloads are better suited to acquire actionable information if the damage was a result of rain, wind, storm surge, fire, etc. Certain UVs (e.g, aerial VTOL, aerial fixed wing, terrestrial, by-modal) are better suited to access and image damage based on location, accessibility, and other hazards.

Although at least one embodiment in FIG. 2 depicts that an unmanned vehicle 100 that is vehicle 110, is it contemplated herein that any vehicle may be deployed and/or utilized in such a way as to practice one or more elements, systems, and/or methodologies as described herein.

Figure 4:
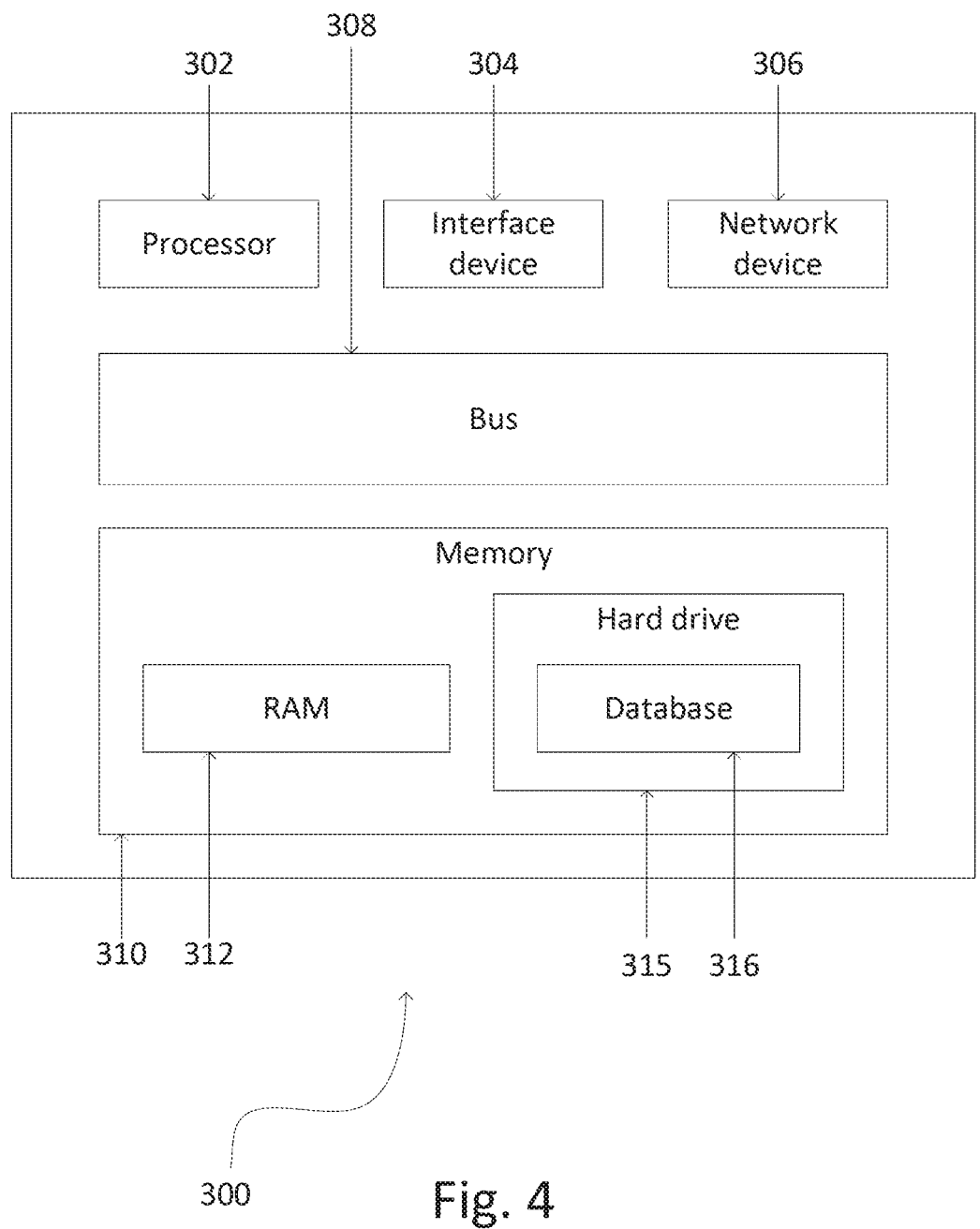
FIG. 4 is an exemplary computing device that may be utilized to practice one or more aspects of this disclosure.

Referring to FIG. 4, illustrated therein is an exemplary embodiment of a computing device as might be used when utilizing the systems and methods described herein. In one embodiment, computing device 300 includes memory 310, a processor 302, an interface device 304 (e.g., mouse, keyboard, monitor), a network device 306. Memory 310 in one example comprises a computer-readable signal-bearing medium. One example of a computer-readable signal-bearing medium comprises a recordable data storage medium, such as a magnetic, optical, biological, and/or atomic data storage medium. In another example, a computer-readable signal-bearing medium comprises a modulated carrier signal transmitted over a network coupled with system 90, for instance, a telephone network, a local area network ("LAN"), the Internet, and/or a wireless network. In one example, memory 310 includes a series of computer instructions written in or implemented with any of a number of programming languages, as will be appreciated by those skilled in the art.

Memory 310 in one example includes RAM 312, hard drive 315, which may include database 316. Database 316 in one example holds information, such as information that relates to users and/or parties interacting with system 90. Further, database 316 may reside at a location other than on server 150.

The terms "engine" and "module" denote a functional operation that may be embodied either as a stand-alone component or as an integrated configuration of a plurality of subordinate components. Thus, engines and modules may be implemented as a single engine/module or as a plurality of engine/modules that operate in cooperation with one another. Moreover, engines/modules may be implemented as software instructions in memory 310 or separately in any of hardware (e.g., electronic circuitry), firmware, software, or a combination thereof. In one embodiment, engines/modules contain instructions for controlling processor 302 to execute the methods described herein. Examples of these methods are explained in further detail in the subsequent of exemplary embodiments section-below.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention.

What is claimed:

1. A vehicle comprising:
   at least one processor; and
   memory storing instructions that, when executed by the processor, cause the vehicle to:
   deploy to a location associated with at least one property;
   gather data;
   determine a portion of the gathered data indicating an event at the at least one property; and
   encrypt the determined portion of the gathered data.

2. The vehicle of claim 1, wherein the event comprises at least one of a gas leak or a fire.

3. The vehicle of claim 1, wherein the data comprises thermal data.

4. The vehicle of claim 1, wherein the vehicle comprises a multi-mode vehicle having two or more of terrestrial, aerial, or nautical functionalities.

5. The vehicle of claim 1, wherein the at least one property comprises a smart home; and
   wherein the event comprises an operation performed by a smart home device located at the smart home.

6. The vehicle of claim 5, further comprising controlling, based on the gathered data, the smart home device.

7. The vehicle of claim 1, wherein the at least one property comprises a smart home; and
   wherein the vehicle is configured to communicate with at least one smart home device of the smart home.

8. The vehicle of claim 7, wherein the instructions, when executed, cause the vehicle to transmit, to the at least one smart home device, a code; and
   gain access, based on transmitting the code, to the smart home.

9. A method comprising:
   identifying at least one property about which to gather information;
   deploying a vehicle to a location associated with the at least one property;
   gathering data, by the deployed vehicle;
   determining a party authorized to access the gathered data; and
   encrypting, using a key associated with the party, at least a portion of the gathered data determined to be associated with the at least one property.

10. The method of claim 9, further comprising encrypting a different portion of the gathered data using a different key associated with a different party.

11. The method of claim 9, further comprising storing the encrypted at least the portion of the gathered data in a storage location associated with the party.

12. The method of claim 9, further comprising determining, based on an amount of data purchased by the party, an amount of the at least a portion of the gathered data;
    wherein the encrypting the at least a portion of the gathered data comprises encrypting the determined amount of the at least a portion of the gathered data.

13. A method comprising:
    identifying at least one property about which to gather information;
    deploying a vehicle to a location associated with the at least one property;
    gathering data, by the deployed vehicle;
    determining a portion of the gathered data indicating a condition of the at least one property; and
    encrypting the determined portion of the gathered data.

14. The method of claim 13, wherein the condition comprises damage.

15. The method of claim 13, further comprising determining a party authorized to access the gathered data;
    wherein the encrypting the determined portion of the gathered data comprises encrypting the determined portion of the gathered data using a key associated with the party.

16. The method of claim 13, wherein the data comprises image data; and
    wherein the determining the portion of the gathered data indicating the condition of the at least one property comprises determining a portion of the image data comprising an image of the condition of the at least one property.

17. The method of claim 13, wherein the determining the portion of the gathered data indicating the condition of the at least one property comprises comparing the gathered data to previously gathered data.

18. The method of claim 13, wherein the vehicle comprises an aerial vehicle.

19. The method of claim 13, wherein the at least one property has a first priority; and
    wherein the method further comprises deploying the vehicle to another property having a second priority lower than the first priority.

20. The method of claim 13, wherein the condition comprises a state of a device located at the at least one property.

* * * * *